United States Patent Office 3,552,824
Patented Jan. 5, 1971

3,552,824
PHOTOCHROMIC LIGHT VALVE
Zoltan J. Kiss, Belle Mead, N.J., assignor to RCA
Corporation, a corporation of Delaware
Filed May 13, 1968, Ser. No. 728,474
Int. Cl. G02f 1/38
U.S. Cl. 350—160                                  2 Claims

ABSTRACT OF THE DISCLOSURE

A light valve comprises a photochromic body which can be made to change its index of refraction by irradiating the body with light of a wavelength specific for the photochromic material of the body. The photochromic body is combined with means for modulating a light source so as to cause an image to be formed in response to a refractive index change. For example, a photochromic body may be incorporated in a Fabry-Perot cavity or in a Wollaston type prism configuration.

BACKGROUND OF THE INVENTION

The present invention relates to a photochromic light valve which operates due to a light induced change of the refractive index of a photochromic body.

In modern technology, there are many areas where optical devices have wide potential utility. For example, in the field of communications, the laser, which emits electromagnetic waves in the visible and the near visible spectrum is being exploited as an information carrier. In all forms of data display systems, light waves are the ultimate means of communicating the data to be displayed to an observer. There have also been proposed optical coupling devices for circuits. All these systems require the control of light waves in an efficient manner. A basic component of such a system is a simple on-off switch or in a more advanced system, a device for continuously modulating the intensity of the light beam.

In the past, mechanical devices such as shutters, diaphragms, and the like have been utilized for such purposes. More recently, a number of electro-optical devices based upon the Kerr and Pockels effect have been suggested. Such systems of light switching are set forth and described in U.S. Pat. No. 2,909,972. These systems, while operable, are generally bulky and expensive to manufacture and moreover do not readily lend themselves to miniaturization, which can be quite important in today's technology or to large area devices which are useful in large area displays.

More recently an electro-optical light valve has been proposed in U.S. Pat. No. 3,215,038, wherein an electrochromic material is utilized. In this device, an electric field causes a slight change in the absorption edge and refractive index of an electrochromic material. This device has the disadvantage of requiring extremely high electric fields for its operation in order to get small changes in refractive index and may be subject to breakdown due to these high fields.

One disadvantage of all electro-optic light valves when used as an imaging device in a display is that, in order to obtain a high resolution image, the electro-optical light valve must have a multiplicity of electrodes thereon for addressing small elemental areas of the light valve. It is the composite of these areas which produces the overall image. It would therefore be desirable to have a light valve whereby no complicated electrode pattern or addressing scheme is required. The novel device of this invention provides such a light valve.

SUMMARY OF THE INVENTION

A light valve comprises a photochromic body, light means for causing a change in the refractive index of said body, means responsive to said change in refractive index for causing modulation of light in accordance with said refractive index change.

DESCRIPTION OF THE PREFERRED EMBODIMENTS

It has been found that photochromic materials exhibit a change in their index of refraction when there is a change in the color or absorption characteristics of the photochromic material. Generally, a photochromic material may be defined as a material which has photon inducible and photon erasable absorption bands. In the past, light valves and display devices incorporating photochromic materials depended solely upon the photon induced color changes obtainable therein. The present invention, however, utilizes the light-induced change in the index of refraction. By utilizing the process of changing the index of refraction of a material by means of light impinging thereon, a light valve for an imaging or display device can be made without the need for the complicated addressing schemes necessary in prior art electrooptic devices.

Figure 1:
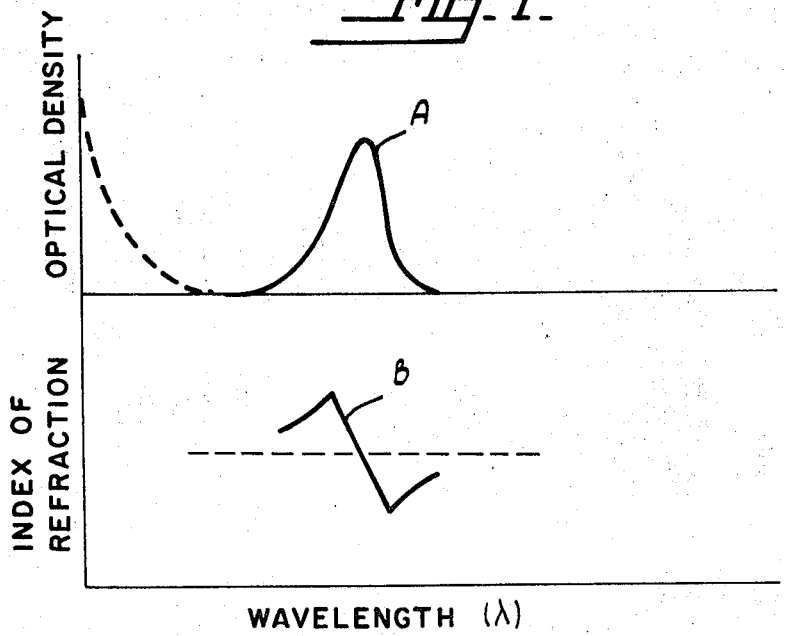
FIG. 1 is a graphical representation of the change in refractive index associated with a change in absorption of a photochromic material.

The optical characteristics of a photochromic material is shown in the graph of FIG. 1. In thiis figure, both optical density and index of refraction are plotted versus wavelength for an idealized photochromic material having a photon inducible absorption band in a wavelength region, where prior to the inducement of said band, there is zero absorption. The dotted lines of the graph represent the optical density and the index of refraction of the material prior to the inducement of the absorption band A. The change in index of refraction accompanying the change in absorption is shown by the solid curve B. This photon inducible change in the index of refraction of a photochromic material may be utilized in devices similar to electro-optic devices employing the Kerr and Pockels effect which give rise to a change in the refractive index of a material upon the application of an electric field thereto. Several specific devices are described below.

Figure 2:
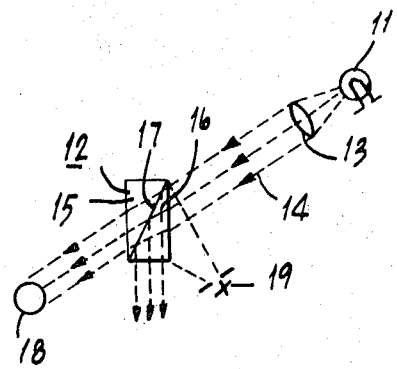
FIG. 2 is an elevational view of a novel light valve which is particularly useful for on-off type of switching.

FIG. 2 illustrates a simplified on-off light switch. A monochromatic point source 11 emitting light within the region of the photon-induced index of refraction change of a photochromic light valve 12, causes light to shine upon a collimating lens 13. This lens forms a parallel beam of light 14 which further passes through the light valve 12 which is in the form of a Wollaston prism. The Wollaston prism 12 is comprised of two triangular prisms 15 and 16 bonded together along the plane 17 of the hypotenuse of the cross section of these prisms. At least one of the triangular prisms is comprised of a photochromic material. In this example, the triangular prism 16 is photochromic. The Wollaston prism 12 is oriented with respect to the collimated light 14 such that the light 14 passes through the prism from one major face to the other major face when the photochromic material has a first index of refraction but is totally internally reflected at the bonding plane 17 of the two triangular prisms 15 and 16 comprising the Wollaston prism when the index of refraction of the photochromic material is changed, thereby causing the light 14 to emerge from the Wollaston prism 12 in a direction completely different from that when the photochromic material was in its first absorption state corresponding to a first index of refraction. This effect is achieved when the direction of the collimated light beam 14 entering the Wollaston prism 12 is at an angle with respect to the bonding plane 17 of the prism 12 which is just less than the critical angle required to give total internal reflection when the photochromic material is in its first absorption state, but where the changed refractive index of the photochromic material associated with the change in absorption state causes deflection of the light beam 14 to such a degree that the angle of incidence upon the bonding plane 17 becomes greater than the critical angle, thereby causing the light beam to be totally internally reflected. FIG. 2 also indicates a detector 18 for receiving the light 14 emerging from the Wollaston prism in one of the two possible emerging directions. In addition, the figure indicates a second light source 19 for creating a change in the index of refraction of the photochromic body. This light source can include both a coloring and a bleaching light so as to provide a switch for switching the index of refraction of the photochromic body from one state to another.

Figure 3:
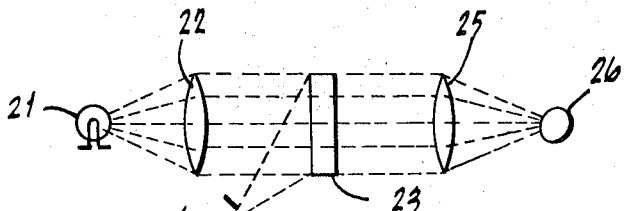
FIG. 3 is an elevational view of a novel light valve and incorporating a Fabry-Perot interferometric cavity.

FIG. 3 illustrates a simplified light modulation system in which a monochromatic light source 21 causes light to shine upon a collimating lens 22. The collimating lens 22 forms a parallel light beam which further passes through a Fabry-Perot interferometric cavity 23, which cavity is comprised of a photochromic material. Variation in the index of refraction of the photochromic material caused by a coloring light source 24 acts as a switching element of the system. The light emerging from the Fabry-Perot cavity passes through a condensing lens 25 which focuses the light on a photodetector 26, such as a photocell. When the photochromic body 23 is in its initial absorption state corresponding to a given index of refraction, light of a first intensity reaches the photocell 26, and when light is made to impinge on the photochromic body 23 so as to change its absorption state, and also its index of refraction, light of a different intensity reaches the photodetector 26. Such a system may be used as a simple light modulator.

If the detector unit is coupled with an amplifier (not shown) which is chosen so that when light of a first intensity falls on the photodetector 26, no signal will be developed by the amplifier, and when light of a different intensity falls upon said photodetector, the signal will be developed, the system may be used as an on-off switching element for performing optical logic. The interferometric cavity or etalon 23 is designed such that when a photochromic material is in one absorption state, that is, when the photochromic material has one index of refraction, the effective path length of the monochromatic light through the Fabry-Perot cavity is an integral multiple of λ/2 where λ is the wavelength of the monochromatic light. In this condition, there is a maximum reinforcement of the light rays and these light rays are reflected back in the direction from which they came, so that no light strikes the photodetector 26. When the index of refraction of the photochromic interferometric cavity 23 is changed, so as to change the effective optical path length to something other than an integral multiple of λ/2, a portion of the light is then transmitted through the cavity 23 and focused by means of the condensing lens 25 onto the photodetector 26. The quantity of light so transmitted is dependent upon the change in the index of refraction from the integral multiple of λ/2. While the above description with reference to FIG. 2 was made using a point source of light, the system is also applicable where a broad source of light is employed. In this latter case, a shift in the Hatinger fringes can be made to cause changes in the intensity of light impinging on the photodetector 26. If one changes the refractive index in selected regions of the cavity 23 an image having a gray scale can be produced.

A light modulation system as described with respect to FIG. 3 may be comprised, for example, of a photochromic Fabry-Perot cavity 23 consisting of a photochromic strontium titanate single crystal which has been doped with 0.03% iron and 0.03% cobalt and where the crystal is approximately 1 centimeter long, and has its faces polished parallel to better than 10 seconds of arc and has a reflective coating, such as aluminum, on said faces to give a 95% reflectivity on each face. The light source 21 employed with this photochromic Fabry-Perot cavity 23 may be, for example, a tunable krypton laser. The detector 26 may be an RCA 6199 photomultiplier tube. Light from a mercury arc lamp, filtered to pass a range of wavelengths from 3100 angstroms to 4600 angstroms is provided as the switching light 24 for changing the refractive index of the photochromic body. This light darkens the crystal in the visible range. Red and yellow light from the krypton laser is employed to bleach the crystal, thereby returning it to its original index of refraction and color. Changes in the index of refraction in the order of several parts in $10^5$ have been observed, and almost 100 percent modulation of the light through the Fabry-Perot cavity is possible.

Figure 4:
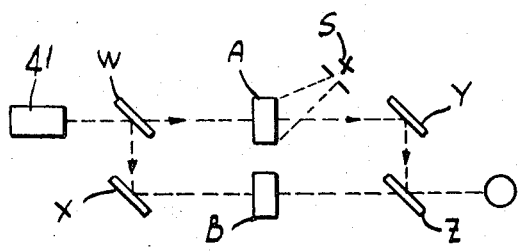
FIG. 4 is an elevational view of a novel light modulator which uses wave interference phenomenon.

FIG. 4 illustrates a light modulating system using wave interference phenomena. The apparatus includes a monochromatic light source 41 and a first beam splitter W of any well known type adapted to substantially equally divide the output of the monochromatic light source between the two optical paths formed by the beam splitter 42. Mirrors X and Y perform the functions of directing the light beams which pass through the optical elements A and B, respectively, where at least A is a photochromic body, to set up the equal length light paths WXZ and WYZ. The member Z is likewise another well known unit similar to W for combining the light from units A and B into a single output beam where the interference phenomena may be observed. As stated above, the overall light paths WXZ and WYZ are of equal length as are the lengths of the two optical elements A and B. Thus, assuming the elements A and B are identical optically, that is, have the same refractive index, the light output from element Z will be the result of the addition of the two light beams, since the beams entering Z are in phase. When a switching light, for example, from a light source S impinges on the photochromic body A, so as to change its index of refraction in the wavelength region of the monochromatic light source 41, the effective optical path length of the path WYZ in the interferometric modulator is changed, thereby causing the light from the two paths to be out of phase when combined at Z, such that the intensity of the beams will cancel each other out in an amount dependent upon how far out of phase one beam is from the other. If the two beams are 180° out of phase, they will completely cancel each other out, thus giving 100% modulation of the output beam. The amount of which the two beams are out of phase will depend upon the refractive index change in the photochromic body A caused by the switching light impinging thereon.

The photochromic material embodying the novel light valves include all photochromic materials and are not limited to the strontium titanate as described above. The photochromics may be organic or inorganic, may be single crystalline or polycrystalline, pure or dissolved in solution or dispersed in another medium. When the photochromic material is polycrystalline, it should be used in the form of a solution or dispersion so as to prevent scattering of light from the surfaces of the crystallites. Examples of useful photochromic materials include calcium fluoride doped with certain rare earth ions, e.g. Ce or La sodalite, calcium titanate doped with Mo. Still other examples of photochromics useful in the novel devices can be found with reference to U.S. Pats. Nos. 3,322,552; 3,314,795; 3,329,502; and 3,355,294.

The novel light valves of this invention are especially useful in display and imaging devices, particularly where a high resolution image is desired. The novel light valves can be used as such an image forming device by changing the index of refraction of the active photochromic light valve material in predetermined selected areas thereof in accordance with the image to be formed. This can be accomplished, for example, by scanning the photochromic body with switching light wherein the intensity of the switching light impinging on any given spot of the photochromic body is modulated in accordance with the desired image to be formed. Alternatively one can use a "contact" printing technique for switching selected areas of the photochromic body of the light valve whereby an image in the form of, for example, a negative is placed between the light photochromic body and a collimated beam of switching light such that the intensity of the switching light made to impinge on the photochromic body will vary from point to point in accordance with the image on the negative.

What is claimed is:

1. A light modulating system comprising in combination a monochromic light source to be modulated, a light valve comprised of a photochromic body, light means for altering the refractive index of said body in the wavelength region of the light emitted from said light source, a photodetector coupled to said light source and photochromic body so as to be responsive to a change in the refractive index of said photochromic body wherein said photochromic body comprises an interferometric cavity.

2. A light modulating system comprising in combination a monochromatic light source to be modulated, a light valve comprised of a photochromic body, light means for altering the refractive index of said body in the wavelength region of the light emitted from said light source, a photodetector coupled to said light source and photochromic body so as to be responsive to a change in the refractive index of said photochromic body wherein the light emitted from said light source which is to be modulated is split by a beam splitter prior to passing through the photochromic body, and wherein said light beams are thereafter recombined so as to add or subtract in intensity dependent upon the relative phases of the light beams upon recombination.

References Cited

UNITED STATES PATENTS

| | | | |
|---|---|---|---|
| 3,372,972 | 3/1968 | Schmidt et al. | 350—160 |
| 3,395,961 | 8/1968 | Ready | 350—160 |

WILLIAM L. SIKES, Primary Examiner

U.S. Cl. X.R.

360—106